May 9, 1933.   D. C. TALBOT   1,908,196
LIQUID LEVEL GAUGE
Filed April 14, 1930
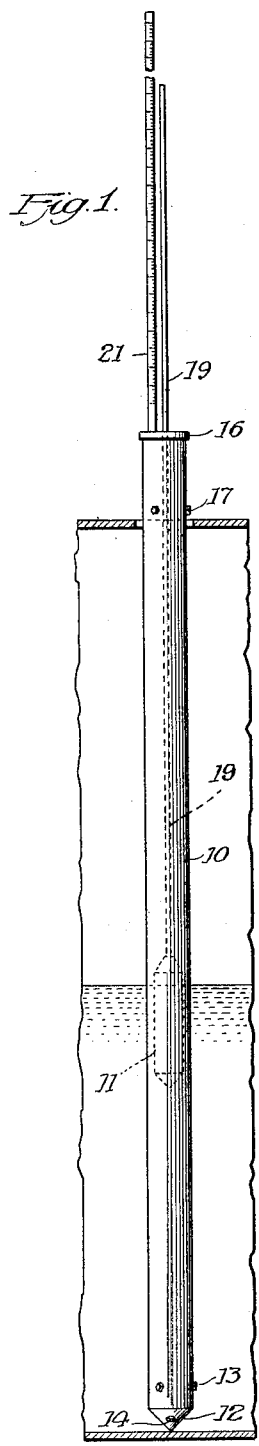
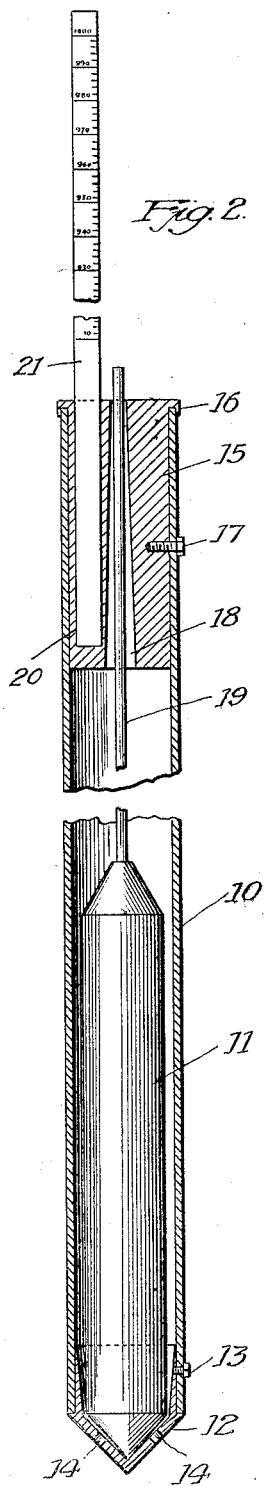
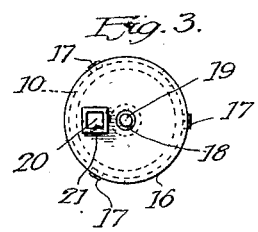
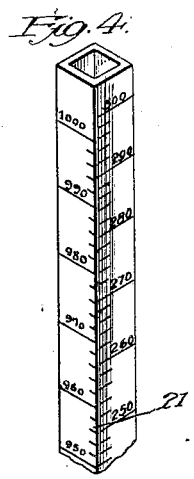
Inventor
David C. Talbot
By Murray & Murray
Attys Patented May 9, 1933

1,908,196

UNITED STATES PATENT OFFICE

DAVID C. TALBOT, OF CHICAGO, ILLINOIS

LIQUID LEVEL GAUGE

Application filed April 14, 1930. Serial No. 444,288.

My invention relates to liquid level gauges, and more particularly to a novel form of gauge for sunken tanks.

The accurate measurement of the contents of a sunken tank at any desired time has presented a problem to the trade, and numerous objections have arisen to the methods heretofore employed for this purpose.

It is well known that the operator of a gasoline filling station for example, suffers annually considerable loss due to leakage and evaporation of the gasoline in the sunken tank. It has been found practically impossible due to these causes, for the operator to determine at any given time, the contents of the tanks. The only accurate means for determining the periodic content of the tank is to pump the same dry. Obviously the determination of the contents at any particular time without pumping the tank dry, in a simple and economical manner, is to be desired.

An object of my invention is to provide a portable liquid level gauge of novel construction, economically manufactured, rigid, and consistently reliable and accurate.

A further object of my invention is to provide a portable gauge adapted to be used with a plurality of tanks of different internal dimensions to indicate the exact content thereof with ease and accuracy.

My invention will be more readily understood by reference to the accompanying drawing, in which Fig. 1 is a side elevation of a tank constructed in accordance with my invention, inserted in a tank;

Fig. 2 is a vertical sectional view of my gauge;

Fig. 3 is a plan view of the gauge; and

Fig. 4 is a fragmentary perspective view of the indicator.

By reference to the drawing, it will be seen that I provide a relatively long circular cylinder 10 open at both ends, and having the float 11 confined loosely therein. The base of the cylinder 10 is provided with a removable cap 12, secured to the cylinder by the studs 13, or in some other suitable manner. The cap has the apertures 14 therein to permit the entrance of the fluid in the tank into the float cylinder.

The top of the cylinder is closed by the plug 15, having the overhanging flanges 16. The plug may be secured to the cylinder by the studs 17 or in any other suitable manner. The plug 15 has a central aperture 18 therein of substantially conical shape in cross section, through which passes the indicating rod 19 attached to the float 11. The aperture 18 is formed in this manner to provide the least frictional resistance to the passage of the rod 19 therethrough.

On the side of the plug 15 I provide a seat 20 for the reception of the gauge rod 21 therein. The rod 21 may be of any desired number of faces, and each face may bear indications adapted to read on a particular tank. Thus, the device is adapted for use with a plurality of tanks by simply rotating the rod 21 to present the proper face to the rod 19.

It will thus be seen that I provide a gauge that is simple in construction, readily assembled in an economical manner, of rigid construction, and capable of accurate reading.

In use the tank may be drained and a predetermined amount of fluid poured into the tank. A marking is then made on a particular face of the gauge rod 21. Further predetermined quantities of fluid are introduced into the tank and periodic markings made on the marker.

The gauge may be then removed and placed into another tank and the process of marking the same accurately, repeated by simply presenting a new face to the rod 19. This may be repeated for a plurality of tanks and markings made on the rod 21 to indicate the particular tank measured. Thereafter, the gauge may be inserted into the tank at any time, and accurate readings taken.

If desired, the indicating rod 21 may be prepared in advance for measurements with a particular tank, but this method has been found inadvisable and impractical to obtain accurate readings on a plurality of tanks of various sizes and diameters.

The gauge of my invention may be manufactured cheaply and will be capable of much abuse and will still read accurately. The float rod having a slight surface of frictional resistance, will not bind, and the smooth face of the inside of the cylinder will permit free passage of the float therethrough in any position.

Obviously, modifications and variations may be made in the construction herein disclosed, and I do not wish to be limited except as indicated in the appended claims.

I claim:

1. A portable liquid level gauge adapted for use with a predetermined number of tanks of dissimilar internal measurements, which comprises, in combination a relatively long metal cylinder, having a perforate closure at the bottom and a plug closing the top, said plug having a central aperture and a recess therein providing a gauge bar seat of non-circular cross section, a gauge bar of non-circular cross section at its base, said base being adapted to be removably reecived in said seat, said gauge bar having a plurality of faces thereon, each face being marked for a different tank and being adapted to occupy a plurality of angular positions in its seat, a metal float within said cylinder, and a float level indicating rod on said float, said rod passing through the aperture in said plug, and the extremity thereof in association with the markings on one face of said gauge bar, serving to indicate the liquid contents of the tank in which it is operated.

2. A portable liquid level gauge adapted to be used to measure the liquid level in any one of a plurality of tanks of dissimilar internal measurements which comprises a relatively long metal cylinder open at its lower end, a centrally apertured plug closing the upper end of the cylinder, said plug having a non-round gauge bar socket formed therein, a gauge bar having a plurality of faces adapted to contain graduations corresponding to the capacity of different tanks, said bar having its lower end shaped to be received in said socket in positions to present different faces, a float in said cylinder, and a float-level-indicating rod on said float and extending through the aperture in the plug, the extremity of the float rod, in association with the graduations on the face of said gauge bar corresponding to the particular tank to be tested, serving to visually indicate the exact liquid level.

In testimony whereof I have affixed my signature.

DAVID C. TALBOT.